Patented Nov. 29, 1949

2,489,758

UNITED STATES PATENT OFFICE 2,489,758

MINERAL SALT BLOCK

Joseph A Dunn, St. Clair, Mich., and Frank G. Miller, Denville, N. J., assignors to General Foods Corporation, New York, N. Y., a corporation of Delaware No Drawing. Application June 15, 1948, Serial No. 33,223

8 Claims. (Cl. 99—2)

This invention relates to the addition of trace mineral supplements to the normal animal diet and more particularly to the incorporation of such supplements in salt blocks and the prevention of loss thereof from the salt blocks before consumption. This application is a continuation in part of our prior applications Serial Nos. 704,-285 and 104,286 filed October 18, 1946.

A few principal mineral elements make up the greater part of the mineral content of the animal body, including calcium, magnesium, sodium, potassium, phosphorus, sulphur and chlorine. The average animal diet is fairly well supplied with these principal mineral elements. However, other dietary minerals are utilized in very small amounts as compared with the principal mineral elements so that they are commonly referred to as "trace elements" and it is well known that the normal animal diet often fails to supply even the very small daily requirements of certain of these trace elements. Examples are trace metals such as iron, copper, manganese, cobalt and zinc and the trace halogens fluorene, iodine and bromine. It has also been found that in some cases the normal diet is not entirely adequate in sulphur and under such circumstances it may be desirable to supplement the diet with small amounts of nutritionally available sulphur comparable to the amounts of trace elements needed. Furthermore, traces of other elements not found in the diet and not normally essential for nutrition may sometimes be desirable nevertheless for special physiological or therapeutic effects. The dietary supplements required to meet such deficiencies may vary from time to time and from place to place as the constitution of the normal diet varies.

Accordingly the addition of trace mineral supplements to the diet is frequently necessary or desirable. These supplements must of course be such that the minerals are made available to the animal during digestion, and also such that they are edible in the sense that the small amounts actually ingested do not cause objectionable toxic effects. When such very small amounts of trace mineral supplements are simply mixed with the far larger amounts of feed normally consumed, it is very difficult to obtain uniform administration to the animals. However, salt is a universal constituent of the animal diet which is consumed in small but fairly constant daily rations, and for these reasons is an excellent medium for incorporating trace mineral supplements in the diet. The desired supplements are simply mixed with the salt in proportions which will furnish the desired amounts of minerals, taking into account the requirements of the animal and the daily ration of salt consumed. Because the daily consumption of salt is small, the much smaller ration of trace mineral supplement may amount to as much as 2-3% by weight of the salt in some cases, although usually it will be less than 1%.

Thus it has been proposed to add trace mineral supplements to salt blocks used for feeding animals, especially iodine in the form of potassium iodide. Salt blocks are conventionally made by compressing ordinary salt under pressures of the order of ten tons per square inch into dense solid masses that are practically vitreous in character. These blocks, usually in 50 lb. sizes, are placed at suitable points as salt licks for cattle and other animals, as for example in feeding sheds, in the open near feeding or watering places, or often on stakes in the open field. However, great difficulty has been encountered in protecting such salt blocks against loss of supplemental minerals. In fact, when the blocks are exposed to the weather under normal conditions of use for 30 to 60 days, the supplemental minerals may disappear practically completely. In the case of iodine, this loss has been generally attributed to oxidation resulting in liberation of free iodine, but iodine continues to be lost in spite of the most effective measures that can be devised to prevent oxidation (see for example Hart Patent No. 2,144,150, Shumaker Patent No. 2,164,089, see Patent No. 2,170,611, Russell Patent No. 2,331,424, and Whitmoyer Patent No. 2,382,193). Moreover, the same loss has been observed in the case of non-volatile and non-oxidizable trace elements such as trace metals.

We have discovered that the above mentioned losses are due in large part, if not entirely, to solution of the mineral compounds used in water or salt brine and actual leaching out of the compounds. Although salt is a very advantageous medium from the above standpoints for incorporating trace mineral supplements in the diet, it is also very hygroscopic and absorbs large amounts of moisture from the atmosphere. As moisture continues to be absorbed by the salt, water or salt brine gradually percolates through the salt.

Salt blocks are dense and practically vitreous in character as stated above and apparently are substantially impervious. However, their density is not equal to the density of solid crystalline salt, the specific gravity of which is 2.16 whereas the specific gravity of salt blocks is 2.02 plus or minus depending on the pressure used and the crystalline character of the salt. Thus the blocks contain about 7% of void spaces and to this extent are porous or capillary in nature. We have found that moisture deposited and/or absorbed at the surface of the block gradually diffuses or percolates throughout the block under the influences of capillary action and gravitation. The mineral compounds are present only in very small amounts and moreover are admixed in finely divided form with the salt so that they are distributed as small particles on the surfaces of the salt crystals and constitute a sort of external phase which tends to be preferentially dissolved. Under these conditions, the small amounts of mineral compounds are rapidly dissolved, even though they may be only very sparingly soluble in the percolating water or salt brine.

The percolating moisture first dissolves both salt and mineral compounds from the surface layer of the block and, as the solution percolates inwardly and downwardly through the block, its concentration of both mineral compound and salt progressively increases until the solution passes out of the bottom of the block. Such percolation takes place under humid conditions regardless of whether the block is exposed to light and/or rain; in other words, the mineral compounds are dissolved in the same way during storage of the block in the dark in a humid warehouse or the like, especially if the relative humidity of the surrounding atmosphere is above the critical range for salt of 70-75%. Thus the surface layer of the block is first depleted very rapidly of supplemental minerals which migrate both toward the center of the block and toward its bottom. The zone of surface depletion steadily increases in depth and the concentration of supplemental minerals in the interior first rises and then rapidly falls as the mineral compounds are lost by escape of the percolating solution from the bottom of the block. Complete depletion of a 50 lb. block may occur within 30 to 60 days simply by exposing it to a humid atmosphere, and this depletion is quite independent of illumination or exposure to sunlight. More important, however, is the fact that practically complete depletion of the surface layer takes place within a very few days after which the animal gets nothing but the salt because the rate of consumption of the block by licking is seldom if ever as great as the rate of increase in depth of the depleted surface zone. It makes no difference how much supplemental mineral is retained in the center of the block if there is none in the surface layer licked by the animal.

The chief object of the present invention is to prevent such losses of supplemental minerals and to maintain the trace mineral supplements in uniform admixture with the salt regardless of the conditions to which the block may be exposed so that the intended supplementation of the diet is secured as the salt is gradually consumed.

We avoid depletion of supplemental minerals from the block due to the above causes by the use of supplemental mineral compounds that are substantially insoluble in the moisture taken up by the surface of the block and in the brine solution resulting from percolation of this moisture through the block. Complete insolubility is not necessary, the limiting condition being that the ratio of solubility of the compound in water containing 0-26% NaCl to the solubility of salt in water should not be substantially greater than the ratio of said compound to salt in the original block. As previously indicated, the amount of each mineral compound will usually be less than 1%, although in special cases 2-3% may be used. The ratio of solubilities must be limited accordingly. If this limiting value is exceeded, the mineral compound will be dissolved and lost at a greater rate than the salt and depletion will take place, beginning at the surface layers of the block. If the limiting value is maintained, however, the proportion of compound to salt in the block and particularly at its surface will remain unchanged although of source there will be a gradual loss in total weight of the block. At less than the limiting value of the solubility ratio, on the other hand, the proportion of compound to salt will increase somewhat not only in the block as a whole but also at its surface.

It will be understood that such insolubility in water containing 0-26% salt must be coupled with a substantial degree of solubility in the digestive fluids found in the gastro-intestinal tract of the animal, in order that the supplemental mineral may become available to the animal during digestion.

The relative solubilities of a particular mineral compound in brine and of salt in water may be ascertained from known data or determined by experiment if such data are not available. In this connection, it is known that the solubility of a substance in a solution is a function of the concentration of other substances in the solution. It is also known that the dispersibility of colloidal material in a solution is a function of the amount of electrolyte present in the solution. These two phenomena are highly important factors in the present invention because the moisture taken up by the surface of the block and percolating through it may vary in salt concentration from zero to saturation (i. e., 0-26%). For example, we have found that certain iodine compounds increase in solubility in salt brine as the salt content increases. Thus mercuric iodide is sparingly soluble in water but its solubility increases sixty-fold in salt brine of a concentration approaching saturation. On the other hand, betane-hydroiodide is two and a half times as soluble in water as in saturated salt brine. Still other iodine compounds exhibit their maximum solubility or dispersibility at intermediate salt concentrations. For the purposes of the present invention, the compounds used should be substantially insoluble and nondispersible (i. e., non-peptizable in the true colloidal sense) in water containing 0-26% salt.

Instead of ascertaining relative solubilities, a simple method of determining whether the desired conditions will be obtained is to analyze the drip from a test block held in an atmosphere of high humidity. As long as the proportion of mineral compound to salt in the drip does not exceed substantially the proportion of said compound to salt in the original block, the retention of the supplemental mineral in the block is satisfactory.

In using this testing method, we have found it satisfactory to employ the following procedure. Small test blocks (approximately 5 gm. in weight) were formed with a laboratory hydraulic press applying pressures equivalent to those used in the commercial production of salt blocks. A series of these small blocks were suspended over suitable test tubes and exposed to a relative humidity of 90% or higher for 43 hours after which the blocks and the respective samples of drip collected in the test tubes were analyzed for their salt and supplemental mineral content. For convenience the results of these analyses were expressed in terms of the percentage of the original content of mineral compound remaining in the test block, 100% retention meaning that none of the supplemental mineral was lost in the drip.

Under the above test conditions, the salt loss from a test block will vary from 5% to 10%. Hence retention figures in the range 90-95% reflect equal rates of loss of supplemental mineral and salt. In other words, the proportion of mineral compound to salt in the block after the test and also in the drip is the same as in the original block. Retention values above 90-95% indicate loss of salt at a faster rate than supplemental mineral and a consequent increase in concentration of the mineral in the block. On the other hand, retention values of less than 90-95%, particularly those less than 85%, indicate that the supplemental mineral is being lost at a sufficiently faster rate than the salt to result in undesirable depletion of the mineral from the surface layers of the block. A striking example of trace element loss was found in the case of a block containing stabilized potassium iodide of the type commonly used in commercial blocks heretofore. Under the conditions of the above test, such blocks were found to have retention values of only 5-35%, meaning that 65-95% of the original iodine content had been lost in drip from the block.

We have correlated results obtained in such rapid retention tests with practical experience when 50 lb. cattle blocks are held in damp warehouses or exposed in the field, and have determined that when retention values of about 85% and higher are obtained with the rapid retention test, the corresponding commercial blocks are effectively stabilized against loss of supplemental minerals. We have also demonstrated that when retention values of 95-100% are obtained with the rapid retention test, the corresponding commercial blocks when stored in damp warehouses or exposed in the field will actually increase in their proportion of supplemental minerals because the salt is preferentially dissolved. This increase is particularly evident at the surface of the block where the mineral is immediately available to the animal at all times.

It will be evident that many different types of compounds can be used in salt blocks to accomplish the purpose and results of the invention as set forth above. In the case of trace metals such as cobalt, manganese, copper, iron and zinc, the most suitable inorganic compounds are the carbonates, hydroxides, and oxides, although a number of miscellaneous inorganic compounds may also be used. Certain organic compounds of these metals such as soaps of the higher fatty acids also are satisfactory. The following are listed as examples of suitable metallic trace element compounds:

Cobaltous carbonate
Cobaltous basic carbonate
Cobaltous hydroxide
Cobaltic hydroxide
Cobaltous oxide
Cobaltic oxide
Cobalt silicide
Cobalt stearate
Cobalt oleate
Cobalt linoleate
Cobalt palmitate
Cobalt behenate
Cobalt arachidate
Basic copper carbonate
Cuprous carbonate
Cuprous hydroxide
Cupric hydroxide
Cuprous oxide
Cupric oxide
Cupric stearate
Cupric palmitate
Cupric behenate
Cupric arachidate
Basic ferric acetate
Ferrous carbonate
Ferrous hydroxide
Ferrum reductum
Ferric hydroxide
Ferrous oleate
Ferrous stearate
Ferrous palmitate
Ferrous behenate
Ferrous arachidate
Ferrous oxide
Ferric pyrophosphate
Ferric orthophosphate
Sodium iron pyrophosphate
Troilite (FeS)
Manganous carbonate
Manganous hydroxide
Manganic hydroxide
Manganous oxide
Manganous-manganic oxide
Manganic sesquioxide
Manganese dioxide
Manganous pyrophosphate
Alabandite (MnS)
Zinc carbonate
Zinc hydroxide
Zinc oleate
Zinc oxide
Zinc phosphate
Zinc stearate
Zinc palmitate
Zinc behenate
Zinc arachidate
Sphalerite (ZnS)

In some cases boron may also be desired as a trace mineral supplement, in which event it may be supplied in the form of any compound satisfying the requirements set forth above. An example is pinnoite ($MgB_2O_4.8H_2O$).

In the case of the trace halogens bromine, iodine and fluorine, suitable compounds are the halogenated insoluble alkaline earth soaps of higher fatty acids such as stearic, behenic, brassidic, palmitic, etc., halogenated fats of high molecular weight, and halogenated insoluble proteins. The insoluble halogenated heavy metal (such as iron and copper) soaps of higher fatty acids may also be used as a source of the halogen as well as of heavy metal trace elements mentioned above. In addition there are a number of miscellaneous types of stable and insoluble iodinated organic compounds of high molecular weight that give excellent retention and are physiologically acceptable. Inorganic halogen compounds may also be used.

The following compounds are listed as examples:

Calcium fluorostearate
Calcium fluorobehenate
Magnesium fluorostearate
Magnesium fluorobehenate
Calcium bromostearate
Calcium bromobehenate
Magnesium bromostearate Magnesium bromobehenate
Fluorostearine
Iron fluorostearate
Silver iodide
Calcium iodostearate
Magnesium iodostearate
Calcium iodobehenate
Magnesium iodobehenate
Zinc iodobehenate
Ethyl diiodo brassidate
Iodostearine
Beta (4 hydroxy 3,5 diiodo phenyl) phenyl propionic acid
3,5 diiodo tyrosine
Thyroxine
Dessicated thyroid gland
Iodinated casein (thyroprotein)
Fluorinated casein
Brominated casein
Tri-iodo benzoic acid
Ortho-iodo benzoic acid
3,5 diiodo 7 hydroxy benzoic acid
Tetra-iodo phthalic anhydride
3,5 diiodo 4 hydroxy benzaldehyde
Dithymol diiodide
Fluorite ($CaF_2$)
Sellaite ($MgF_2$)
Apatite ($CaF_2.3Ca_3.P_2O_8$)

In case an otherwise suitable halogen compound is found subject to decomposition by light or oxidation, it may be stabilized against such deterioration by any suitable method such as those disclosed in the patents mentioned above.

In case the normal diet is somewhat deficient in the principal element sulphur, trace supplements of compounds that provide sulphur in neutritionally available form may also be added to the block. It has been common practice to add mineral sulphur to salt blocks in the belief that it is of value as a medicament and may have a pharmacological value in controlling intestinal flora. Such sulphur is insoluble and is not lost from the block, but on the other hand it is not nutritionally available. For nutritional purposes, sulphur may be added to the block in the form of edible insoluble compounds which liberate sulphide sulphur in ionized form as the result of digestion, examples being the inorganic sulphides lazurite, alabandite, troilite and sphalerite and organic sulphides such as thio acids (e. g., thiostearic acid) and their esters (e. g., ethyl thiostearate). Such sulphide sulphur can be utilized by the animal in building sulphur-bearing amino acids such as cystine. Nutritional sulphur can also be provided in salt blocks by adding thio-proteins (insoluble proteins rich in the sulphur-containing amino acids cystine and methionine and derived from biological sources) such as casein, keratin and collagen. These thio-proteins can also be added in the form of crude materials such as poultry feathers, hair, wool and hides, and horns and hoofs, after suitable processing such as autoclaving to render the thioproteins digestible.

In special cases trace mineral supplements may be desired with respect to minerals which are normally considered toxic but may be both nontoxic and useful for medicinal purposes when used in small amounts. For example, in some sections of the U. S. animals are subject to selenium poisoning due to intake of excessive amounts of selenium in the normal diet. It is known that in such cases arsenic acts as an antidote to selenium poisoning and is beneficial when ingested in small amounts. Thus an arsenic compound such as arsenic trisulphide ($As_2S_3$) may be desirable as a trace mineral supplement.

Assuming that all of the supplemental minerals mentioned above are to be incorporated in the block, the following formula is illustrative:

| | Per cent |
|---|---|
| Zinc carbonate | 0.01 |
| Arsenic trisulphide | 0.0025 |
| Pinnoite | 0.01 |
| Manganese carbonate | 0.35 |
| Reduced iron | 0.10 |
| Basic copper carbonate | 0.10 |
| Cobalt carbonate | 0.01 |
| Thymol diiodide | 0.0175 |
| Calcium fluoride | 0.005 |
| Calcium bromobehenate | 0.01 |
| Lazurite | 0.25 |
| Thioprotein | 1.00 |
| Salt (NaCl) | To make up 100 |

It will be understood that the particular compounds that are listed in the above formula are only by way of example and that any other suitable compounds can be substituted therefor. Also the amounts of the compounds given in the formula are based on the amounts of the supplemental minerals that are desired in the animal diet, and where other compounds are substituted they should be used in amounts determined on the same basis. On the other hand, the amount of any particular supplemental mineral that is needed will depend upon the normal constitution of the animal diet in the region where the block is to be used and hence the proportions given above are subject to considerable variation. It may also be desirable to vary the constitution of the block by omitting certain of the supplemental minerals listed in the above formula and/or by incorporating others in the blocks.

It is often desirable to color such supplemented salt blocks to distinguish them from ordinary salt blocks. The compounds themselves may provide sufficient coloring for this purpose. For example, the use of lazurite (ultra-marine blue) in the above formula as a source of sulphide sulphur also produces a blue color. However, pigments may be added if desired, and different colors may be used to differentiate blocks of varying composition.

In controlling deficiency diseases by dietary trace mineral supplements, one of the major problems is to secure approximately uniform administration of such supplements to individual animals because of the very small amounts of supplemental minerals needed, the practical difficulty of distributing such small amounts uniformly throughout feed mixtures, etc. It will be seen that salt blocks embodying the present invention eliminate such difficulties and provide a very convenient and practical means of administering supplemental mineral elements to animals in uniform controlled trace amounts. The consumption of salt by an animal such as a cow, for example, will be reasonably uniform in amount depending on the daily requirement of the animal and is not materially affected by presence of a small proportion of supplemental minerals. The present invention makes it possible to disperse such minerals throughout a mass of salt in definite uniform concentration, although they are present in amounts as small as a fraction of a per cent in proportion to the salt, and also to maintain such concentration substantially unchanged as the block is consumed. Hence each daily, approximately constant ration of salt consumed by the animal contains a definite, predetermined amount of the desired supplemental materials.

In the same way, the invention may be utilized advantageously to administer supplemental minerals to animals for the stimulation of the animal metabolism in various respects. Such administration may be desirable even though there is no deficiency in the normal animal diet. For example, it has been found that production of milk and butter fat can be increased by the temporary administration of thyroprotein (e. g., iodinated casein) in amounts substantially above the normal requirements of the animal. This administration can be effected simply and controlled accurately by the use of salt blocks containing appropriate amounts of thyproprotein either alone or in combination with other supplemental minerals that may be desired. Excessive amounts of other dietary supplements may be administered in the same manner whenever desired.

It will be understood from what has been said above that the invention in its broad aspect is not restricted to particular supplemental minerals or to any particular combination thereof, since the choice of those to be used will depend on the constitution of the normal diet and will vary in different regions. In the case of any particular mineral, moreover, suitable compounds of wide variety are available and selection may be made largely on the basis of availability and cost. The amounts of such compounds to be used can be determined from the requirement of the animal for mineral supplement in proportion to its daily consumption of salt, both of which may vary with different animals, and from the degree of deficiency of the normal diet of the animal.

Hence reference should be had to the appended claims for a definition of the limits of the invention. Reference is also made to our copending applications Serial Nos. 33,224, 33,225, and 33,226.

What is claimed is:

1. A salt block of the type containing a trace mineral supplement to the animal diet in the form of an edible compound of a physiologically beneficial element dispersed throughout a dense solid mass of compressed salt, said compound being substantially soluble in digestive fluids whereby the supplemental element is made available to the animal during digestion but substantially insoluble in water containing 0–26% salt so that it is not dissolved by moisture absorbed by and percolating through the block.

2. A salt block of the type containing a trace mineral supplement to the animal diet in the form of not more than 3% of an edible compound of a physiologically beneficial element dispersed throughout a dense solid mass of compressed salt, said compound being substantially soluble in digestive fluids whereby the supplemental element is made available to the animal during digestion, but the ratio of solubility of said compound in water containing 0–26% salt to the solubility of salt in water being maximally substantially equal to the ratio of the proportion of said compound to the proportion of salt in the block.

3. A salt block containing a trace mineral supplement to the animal diet and of the type comprising not more than 3% of an edible mineral compound dispersed throughout a dense solid mass of compressed salt, said compound being a zinc compound that is substantially soluble in digestive fluids whereby the zinc is made available to the animal during digestion, the ratio of solubility of said compound in water containing 0–26% salt to the solubility of salt in water being maximally substantially equal to the ratio of the proportion of said compound to the proportion of salt in the block.

4. A salt block containing a trace mineral supplement to the animal diet and of the type comprising not more than 3% of an edible mineral compound dispersed throughout a dense solid mass of compressed salt, said compound being an arsenic compound that is substantially soluble in digestive fluids whereby the arsenic is made available to the animal during digestion, the ratio of solubility of said compound in water containing 0–26% salt to the solubility of salt in water being maximally substantially equal to the ratio of the proportion of said compound to the proportion of salt in the block.

5. A salt block containing a trace mineral supplement to the animal diet and of the type comprising not more than 3% of an edible mineral compound dispersed throughout a dense solid mass of compressed salt, said compound being a boron compound that is substantially soluble in digestive fluids whereby the boron is made available to the animal during digestion, the ratio of solubility of said compound in water containing 0–26% salt to the solubility of salt in water being maximally substantially equal to the ratio of the proportion of said compound to the proportion of salt in the block.

6. A salt block containing a trace mineral supplement to the animal diet and of the type comprising an edible mineral compound dispersed throughout a dense solid mass of compressed salt, said compound being zinc carbonate.

7. A salt block containing a trace mineral supplement to the animal diet and of the type comprising an edible mineral compound dispersed throughout a dense solid mass of compressed salt, said compound being arsenic trisulphide.

8. A salt block containing a trace mineral supplement to the animal diet and of the type comprising an edible mineral compound dispersed throughout a dense solid mass of compressed salt, said compound being pinnoite.

JOSEPH A. DUNN.
FRANK G. MILLER.

REFERENCES CITED

The following references are of record in the file of this patent:

UNITED STATES PATENTS

| Number | Name | Date |
|---|---|---|
| 672,672 | Green | Apr. 23, 1901 |

FOREIGN PATENTS

| Number | Country | Date |
|---|---|---|
| 14,622 | Great Britain | 1895 |